(12) United States Patent
Yamazaki

(10) Patent No.: US 6,927,826 B2
(45) Date of Patent: *Aug. 9, 2005

(54) DISPLAY DEVICE

(75) Inventor: Shunpei Yamazaki, Tokyo (JP)

(73) Assignee: Semiconductor Energy Labaratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/748,166

(22) Filed: Dec. 27, 2000

(65) Prior Publication Data

US 2001/0002144 A1 May 31, 2001

Related U.S. Application Data

(62) Division of application No. 09/295,397, filed on Apr. 21, 1999, which is a division of application No. 09/045,697, filed on Mar. 23, 1998, now Pat. No. 6,115,090.

(30) Foreign Application Priority Data

Mar. 26, 1997 (JP) .............................................. 9-092935

(51) Int. Cl.[7] ......................... G02F 1/1333; G02F 1/136
(52) U.S. Cl. ......................................... 349/138; 349/43
(58) Field of Search ............................. 349/42–44, 122, 349/138; 257/59, 72

(56) References Cited

U.S. PATENT DOCUMENTS

| | | | |
|---|---|---|---|
| 4,254,426 A | 3/1981 | Pankove | |
| 4,448,491 A | 5/1984 | Okubo | |
| 4,650,922 A | 3/1987 | McPherson | |
| 4,705,358 A | * 11/1987 | Yamazaki et al. | .......... 350/334 |
| 4,722,913 A | 2/1988 | Miller | |
| 4,804,490 A | 2/1989 | Pryor et al. | |
| 4,845,533 A | 7/1989 | Pryor et al. | |
| 4,869,755 A | 9/1989 | Huschka | |

(Continued)

FOREIGN PATENT DOCUMENTS

| | | |
|---|---|---|
| EP | 0 221 531 | 5/1987 |
| EP | 0221531 | 5/1987 |
| JP | 55-107270 | 8/1980 |
| JP | 58-145134 | 8/1983 |
| JP | 60-145375 | 7/1985 |
| JP | 61-204933 | 9/1986 |
| JP | 61-244068 | 10/1986 |
| JP | 63-015461 | 1/1988 |
| JP | 03-185425 | 8/1991 |
| JP | 03-072711 | 11/1991 |
| JP | 04-027690 | 5/1992 |
| JP | 04-027691 | 5/1992 |
| JP | 05-002187 | 1/1993 |
| JP | 10-010578 | 1/1998 |
| JP | 11-000052 | 3/1999 |

OTHER PUBLICATIONS

R.C.A. Review, vol. 43, No. 4, Dec. 1982, pp. 665–674, J. Zelez, "A Diamond–Like Carbon Film".

Primary Examiner—Dung T. Nguyen
(74) Attorney, Agent, or Firm—Eric J. Robinson; Robinson Intellectual Property Law Office, P.C.

(57) ABSTRACT

There is disclosed a structure for radiating heat generated by TFTs in a liquid crystal panel. A DLC film 125 is provided on a resin interlayer film 123 disposed on the TFTs 105, 109, and 113. The DLC film 125 can be easily formed on the resin film, and has high heat conductivity, so that the film can be made to function as a heat radiating layer.

58 Claims, 3 Drawing Sheets

U.S. PATENT DOCUMENTS

| | | | |
|---|---|---|---|
| 4,972,250 A | 11/1990 | Omori et al. | |
| 5,101,288 A | 3/1992 | Ohta et al. | |
| 5,117,299 A | 5/1992 | Kondo et al. | |
| 5,176,791 A | 1/1993 | Itoh et al. | |
| 5,196,954 A | 3/1993 | Yamazaki et al. | |
| 5,250,451 A | 10/1993 | Chouan | |
| 5,330,616 A | 7/1994 | Yamazaki | |
| 5,392,143 A * | 2/1995 | Akiyama et al. | 349/55 |
| 5,422,658 A | 6/1995 | Kawaguchi et al. | |
| 5,432,527 A * | 7/1995 | Yanai et al. | 345/92 |
| 5,461,501 A | 10/1995 | Sato et al. | |
| 5,536,950 A | 7/1996 | Liu et al. | |
| 5,550,066 A * | 8/1996 | Tang et al. | 437/40 |
| 5,572,046 A | 11/1996 | Takemura | |
| 5,583,369 A | 12/1996 | Yamazaki et al. | |
| 5,621,556 A | 4/1997 | Fulks et al. | |
| 5,652,029 A | 7/1997 | Itoh | |
| 5,686,328 A | 11/1997 | Zhang et al. | |
| 5,686,980 A | 11/1997 | Hirayama et al. | |
| 5,696,386 A | 12/1997 | Yamazaki | |
| 5,706,067 A | 1/1998 | Colgan et al. | |
| 5,712,495 A | 1/1998 | Suzawa | |
| 5,717,224 A | 2/1998 | Zhang | |
| 5,724,107 A | 3/1998 | Nishikawa et al. | |
| 5,739,549 A | 4/1998 | Takemura et al. | |
| 5,747,830 A | 5/1998 | Okita | |
| 5,748,165 A | 5/1998 | Kubota et al. | |
| 5,766,696 A | 6/1998 | Itoh | |
| 5,784,201 A | 7/1998 | Lee et al. | |
| 5,808,315 A | 9/1998 | Murakami et al. | |
| 5,815,231 A | 9/1998 | Nishi et al. | |
| 5,820,947 A | 10/1998 | Itoh | |
| 5,847,410 A | 12/1998 | Nakajima | |
| 5,851,862 A | 12/1998 | Ohtani et al. | |
| 5,856,689 A | 1/1999 | Suzawa | |
| 5,871,847 A | 2/1999 | Itoh | |
| 5,879,741 A | 3/1999 | Itoh | |
| 5,952,708 A | 9/1999 | Yamazaki | |
| 5,963,278 A | 10/1999 | Yamazaki et al. | |
| 5,989,672 A | 11/1999 | Hayashi | |
| 5,990,491 A | 11/1999 | Zhang | |
| 5,990,542 A | 11/1999 | Yamazaki | |
| 5,995,189 A | 11/1999 | Zhang | |
| 6,001,431 A | 12/1999 | Itoh et al. | |
| 6,005,648 A | 12/1999 | Zhang et al. | |
| 6,055,034 A | 4/2000 | Zhang et al. | |
| 6,097,459 A | 8/2000 | Shimada et al. | |
| 6,110,542 A | 8/2000 | Miyanaga et al. | |
| 6,114,715 A * | 9/2000 | Hamada | 257/72 |
| 6,115,090 A * | 9/2000 | Yamazaki | 349/42 |
| 6,133,073 A * | 10/2000 | Yamazaki et al. | 438/151 |
| 6,163,055 A | 12/2000 | Hirakata et al. | |
| 6,165,582 A | 12/2000 | Hayashi | |
| 6,169,293 B1 | 1/2001 | Yamazaki | |
| 6,171,674 B1 | 1/2001 | Yamazaki et al. | |
| 6,183,816 B1 | 2/2001 | Yamazaki et al. | |
| 6,194,047 B1 | 2/2001 | Hayashi | |
| 6,207,281 B1 | 3/2001 | Itoh | |
| 6,217,661 B1 | 4/2001 | Hirose et al. | |
| 6,224,952 B1 | 5/2001 | Itoh | |
| 6,239,470 B1 | 5/2001 | Yamazaki | |
| 6,249,333 B1 | 6/2001 | Zhang et al. | |
| 6,252,297 B1 | 6/2001 | Kemmochi et al. | |
| 6,258,434 B1 | 7/2001 | Hayashi | |
| 6,261,634 B1 | 7/2001 | Itoh | |
| 6,265,070 B1 | 7/2001 | Itoh | |
| 6,423,383 B1 | 7/2002 | Hirose et al. | |
| 6,441,468 B1 | 8/2002 | Yamazaki | |
| 6,445,059 B1 | 9/2002 | Yamazaki | |
| 6,468,617 B1 | 10/2002 | Yamazaki et al. | |
| 6,621,535 B1 * | 9/2003 | Fukada | 349/40 |
| 2001/0018097 A1 | 8/2001 | Itoh | |

* cited by examiner

DISPLAY DEVICE

This application is a Divisional application of Ser. No. 09/295,397, filed Apr. 21, 1999, which itself is a Divisional application of Ser. No. 09/045,697, filed Mar. 23, 1998 now U.S. Pat. No. 6,115,090.

BACKGROUND OF THE INVENTION

1. Field of the Invention

The present invention relates to the structure of a reflection type liquid crystal display device.

2. Description of the Related Art

A reflection type liquid crystal panel has been known. Also, in an active matrix type liquid crystal panel, there is known a structure in which a peripheral driving circuit is integrated on the same substrate as an active matrix circuit. This structure is known as a peripheral driving circuit integration type.

In a peripheral driving circuit integration type liquid crystal panel, as a result that high picture quality is pursued, a peripheral driving circuit is required to operate at such a high speed as several tens MHz or more.

However, high speed operation causes a problem of heat generation from a device. Especially, since a liquid crystal panel uses a glass substrate or a quartz substrate, the panel has a problem that there is no escape for heat generated by a device (the thermal conductivity of quartz is $1/100$ or less than that of single crystal silicon).

Also, a reflection type liquid crystal display panel is easy to secure a required aperture factor even if it is miniaturized. Accordingly, it has been considered to use the display panel for a projection type display.

However, since a liquid crystal panel for a projector is miniaturized (about 3 inches or less in diagonal), the above described problem of heat generation (heat generation from a peripheral driving circuit) especially becomes important.

Specifically, the peripheral driving circuit has such problems that the device characteristic is changed or deteriorated, or the device itself is broken by the heat generated by the circuit itself.

SUMMARY OF THE INVENTION

An object of the present invention is therefore to provide a structure of a display device capable of solving this sort of problem.

According to one aspect of the present invention, a display device is comprised of a pixel matrix portion; a peripheral driving circuit portion disposed on the same substrate as the pixel matrix portion; a thin film transistor disposed in each of the pixel matrix portion and the peripheral driving circuit portion; an interlayer insulating film made of resin material and disposed over the thin film transistor; and a carbon film disposed on the interlayer insulating film.

According to another aspect of the present invention, a display device is comprised of a pixel matrix portion; a peripheral driving circuit portion disposed on the same substrate as the pixel matrix portion; a thin film transistor disposed in each of the pixel matrix portion and the peripheral driving circuit portion, an interlayer insulating film made of resin material and disposed over the thin film transistor; and a carbon a film as a heat releasing layer disposed on the interlayer insulating film.

It is preferable to use a DLC (Diamond-like Carbon) film as the carbon film. The DLC film is a carbon film comprising amorphous carbon having $SP^3$ bonds.

DETAILED DESCRIPTION OF THE INVENTION

Figure 1:
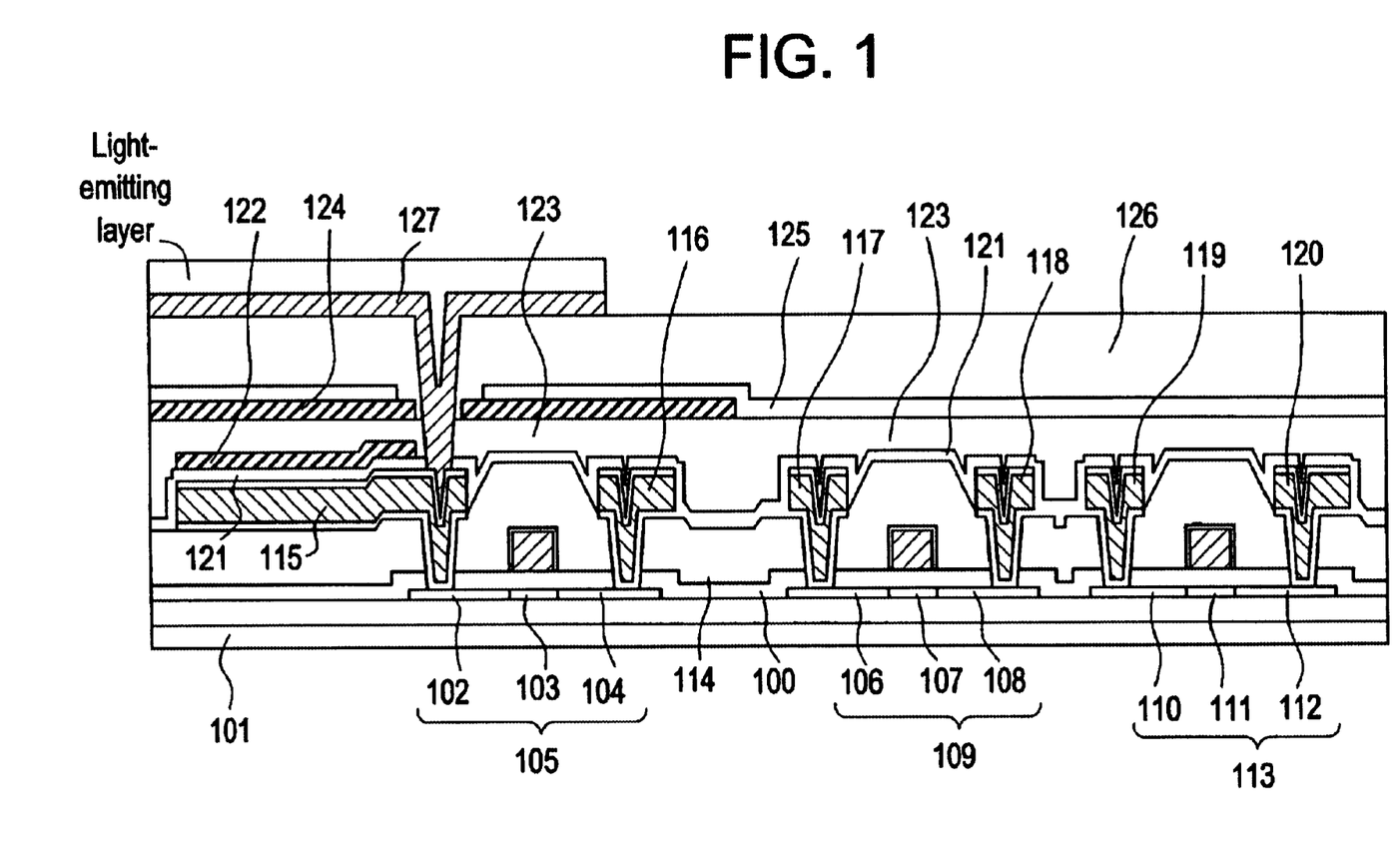
FIG. 1 is a view showing a cross section of a liquid crystal panel.

According to the present invention, as shown in FIG. 1, a DLC film 125 is provided on an interlayer insulating film 123 and a shielding titanium film 124. The DLC film effectively releases heat generated by a pixel TFT 105, and TFTs 109, 113 constituting a peripheral driving circuit.

[Embodiment 1]

FIG. 1 schematically shows a cross section of a reflection type liquid crystal panel using the present invention. In the drawing, reference numeral 101 denotes a glass substrate. A quartz substrate may be used instead of the glass substrate.

An NTFT 105 (N-channel thin film transistor, also called a pixel TFT) disposed in an active matrix circuit, and a PTFT 109 and an NTFT 113 constituting a peripheral driving circuit are disposed on the glass substrate 101.

A drain region 102, a channel region 103, and a source region 104 are formed in the NTFT 105.

A source region 106, a channel region 107, and a drain region 108 are formed in the PTFT 109.

A source region 112, a channel region 111, and a drain region 110 are formed in the NTFT 113.

The thickness of an active layer of the respective TFTs is made 50 nm. A silicon oxide film with a thickness of 100 nm as a common gate insulating film is provided in the respective TFTs.

The respective TFTs are covered with a silicon oxide film 114 with a thickness of 700 nm as an interlayer insulating film.

A source wiring line 116 brought into contact with the source region 104 of the NTFT 105, and a drain electrode 115 brought into contact with the drain region of the NTFT 105, each made of an aluminum film with a thickness of 500 nm, are disposed on the interlayer insulating film 114.

Also, a source electrode 117 brought into contact with the source region 106 of the PTFT 109 constituting the peripheral driving circuit, and a drain electrode 118 brought into contact with the drain region 108 of the PTFT 109 are disposed.

Also, a source electrode 120 brought into contact with the source region 112 of the NTFT 113 constituting the peripheral driving circuit, a drain electrode 119 brought into contact with the drain region 110 of the NTFT 113 are disposed.

A titanium film with a thickness of 100 nm is formed over and under the electrodes and wiring lines designated by 115, 116, 117, 118, 119, and 120. This film is necessary so as to have an excellent contact.

A silicon nitride film 121 with a thickness of 50 nm is formed to cover the electrodes and wiring lines designated by 115, 116, 117, 118, 119, and 120.

Further, a pattern 122 made of a titanium film is formed. A capacitance is formed by the pattern 122 made of the titanium film and the drain electrode 115 through the silicon nitride film 121.

Reference numeral 123 denotes a polyimide resin film with a thickness of 800 nm. This resin film is provided to absorb roughness formed by the existence of the TFTs, the electrodes, and the wiring lines so that a flattened surface is produced.

Resin material such as polyimide amide, polyamide, acryl, and epoxy may be used other than polyimide.

An electromagnetic shielding pattern 124 made of a titanium film with a thickness of 100 nm is disposed on the interlayer insulating film 123. This electromagnetic shielding pattern is disposed so that a reflecting pixel electrode 127 does not interfere with the source wiring line and the TFT.

A DLC (Diamond-like Carbon) 125 with a thickness of 1000 nm is formed.

Figure 2:
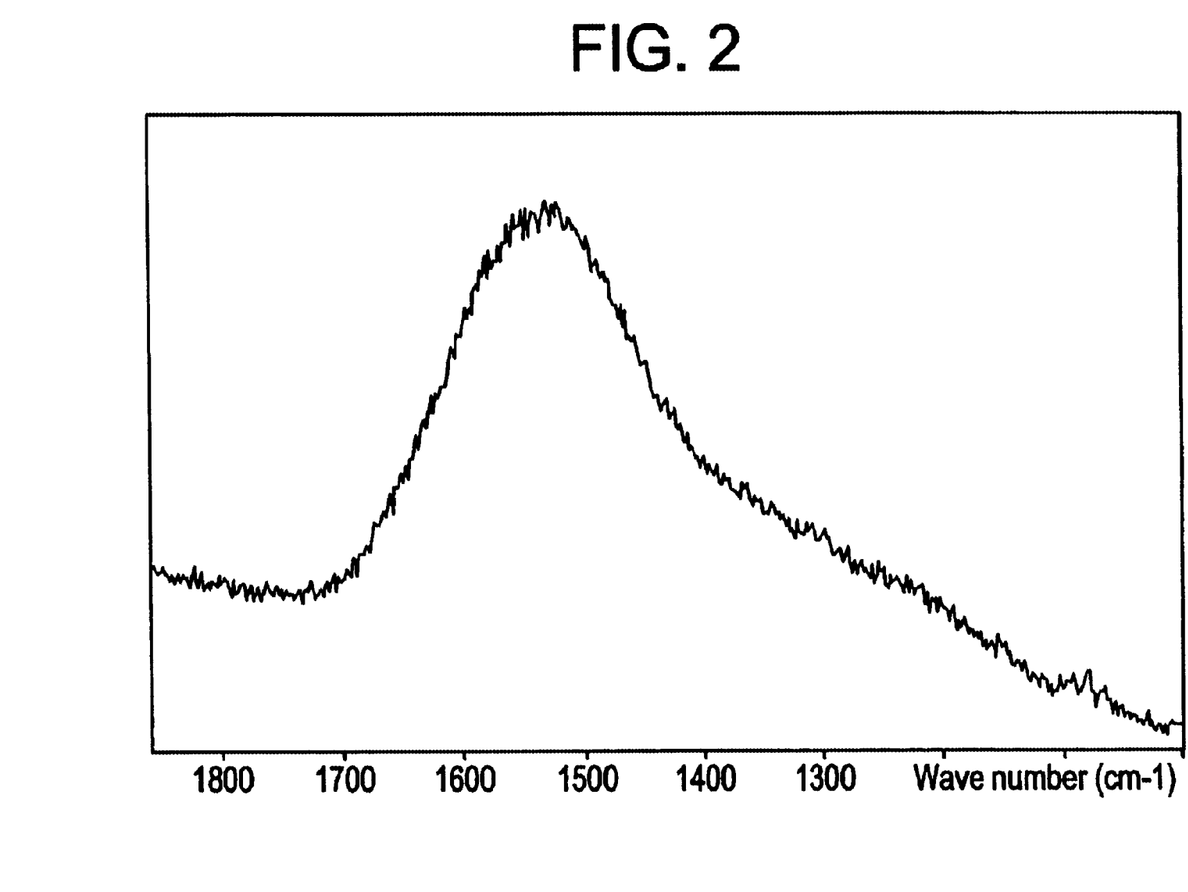
FIG. 2 is a view showing the Raman spectrum of a DLC film.

As the DLC film, it is preferable to use a film which exhibits the Raman spectrum as shown in FIG. 2.

Since the DLC film can be easily formed on the resin material, and has high heat conductivity, the DLC film effectively functions as a heat sink especially for diffusing heat generated by the TFTs of the peripheral driving circuit.

In a reflection type liquid crystal panel, there is no problem even if the DLC film extends to a pixel matrix portion. The adoption of such a structure enables the film to deal with heat generation from not only the peripheral driving circuit but also the pixel matrix portion.

Incidentally, although an AlN film and a diamond film other than the DLC film may be exemplified as a thin film that can be used as a heat sink, the DLC film can be most easily formed on a resin material.

A polyimide resin film 126 with an average thickness of 1 $\mu$m as an interlayer insulating film is formed on the DLC film, and further the reflecting pixel electrode 127 having a thickness of 400 nm and made of aluminum, is provided.

In this embodiment, although a top-gate type TFT is shown, a bottom-gate type TFT may be adopted.

[Embodiment 2]

In this embodiment, examples of display devices using the reflection type liquid crystal panel obtained by using the present invention will be described.

Figure 3A:
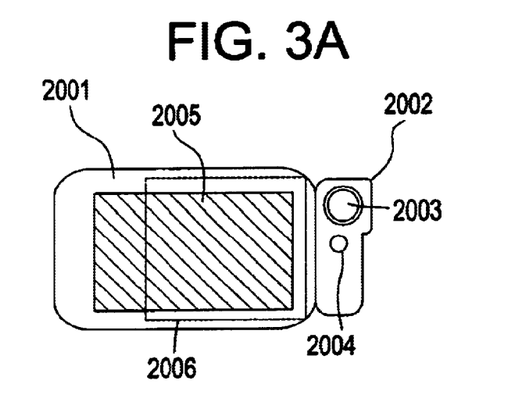
FIGS. 3A to 3F are views schematically showing devices using the present invention.

FIG. 3A shows a portable information processing terminal, which has a communication function using telephone lines.

This device includes an integrated circuit 2006 in the inside of a main body 2001. Further, this device includes a reflection type active matrix liquid crystal panel 2005 in which TFTs as switching elements are disposed, a camera portion 2002 for incorporating a picture image, and an operation switch 2004.

Figure 3B:
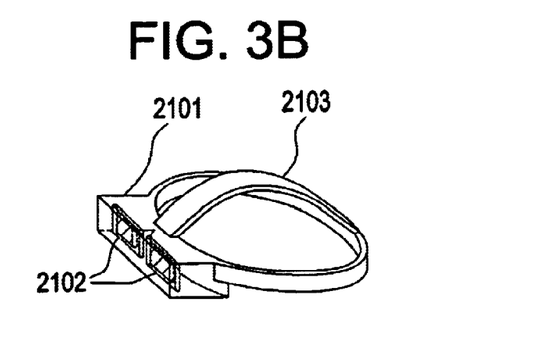

FIG. 3B shows an electric device called a head mount display. This device has a function to display a false picture image in front of eyes when a main body 2101 is mounted on a head through a band 2103. The picture image is formed by active matrix type liquid crystal panels 2102 corresponding to right and left eyes.

Figure 3C:
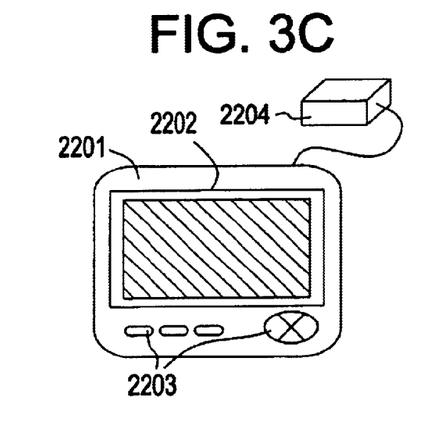

FIG. 3C shows an electric device having a function to display map information and various kinds of information based on signals from an artificial satellite. Information from an artificial satellite is received by an antenna 2204, and is processed by an electric circuit provided in the inside of a main body 2201, and necessary information is displayed on an active matrix type reflection type liquid crystal panel 2202.

The operation of the device is carried out by an operation switch 2203. Even in such a device, a circuit using TFTs is used.

Figure 3D:
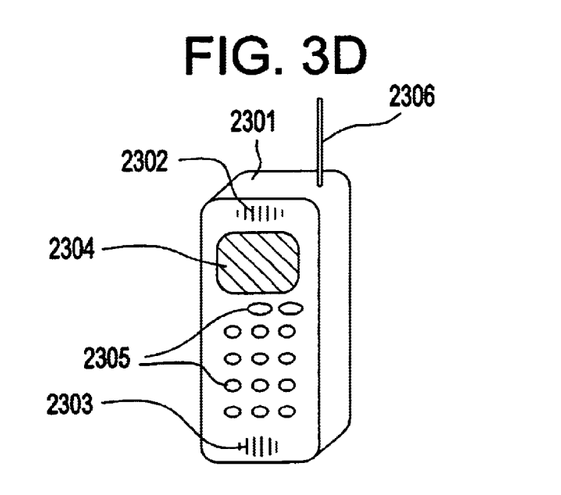

FIG. 3D shows a portable telephone. This electric device includes a main body 2301, an antenna 2306, an audio output portion 2302, a liquid crystal panel 2304, an operation switch 2305, and an audio input portion 2303.

Figure 3E:
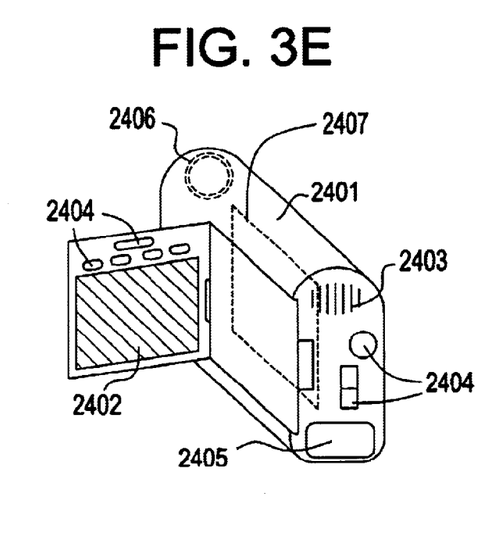

FIG. 3E shows a portable imaging device called a video camera. This device includes a reflection type liquid crystal panel 2402 attached to a close-open member of a main body 2401, and an operation switch 2404 attached to the close-open member.

Further, the main body 2401 is provided with an image receiving portion 2406, an integrated circuit 2407, an audio input portion 2403, an operation switch 2404, and a battery 2405.

Figure 3F:
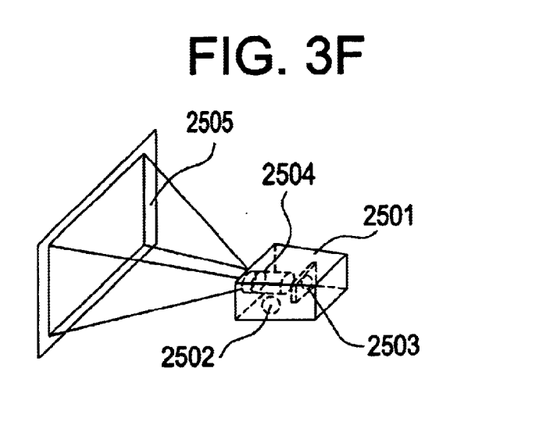

FIG. 3F shows a projection type liquid crystal display device. This device includes a main body 2501 provided with a light source 2502, a reflection type liquid crystal panel 2503, and an optical system 2504, and has a function to project a picture image onto a screen 2505.

It should be noted that the present invention can also be used for a flat panel display other than the case of using a liquid crystal. For example, in an EL display, the present invention can be used when an under layer of a light emitting layer is flattened. The present invention can also be used for an EC display and the like.

That is, the present invention can be used for realizing the structure in which a surface over a pixel region is desired to be flat.

As described above, by using the present invention, it is possible to provide a structure in which heat generated by a peripheral driving circuit can be effectively radiated. Also it is possible to provide a structure in which heat generated in the inside of a liquid crystal panel can be effectively radiated.

What is claimed is:

1. An electroluminescence display device comprising:
   at least one thin film transistor formed over a substrate;
   a first insulating layer comprising organic resin formed over said thin film transistor;
   a second insulating layer, comprising diamond-like carbon formed over said first insulating layer;
   a pixel electrode formed over said second insulating layer, said pixel electrode electrically connected to said thin film transistor; and
   a light-emitting layer formed over said second insulating layer.

2. An electroluminescence display device according to claim 1, wherein said organic resin is selected from the group consisting of polyimide, polyimideamide, polyamide, acryl and epoxy.

3. An electroluminescence display device according to claim 1, wherein said first insulating layer has a planarized surface.

4. An electroluminescence display device according to claim 1, wherein said electroluminescence display device is incorporated into an electric apparatus selected from the group consisting of a portable information terminal, a head mount display, a portable telephone, a video camera and a projector.

5. An electroluminescence display device comprising:
   at least one thin film transistor formed over a substrate;
   a first insulating layer comprising silicon nitride formed over said thin film transistor;
   a second insulating layer comprising organic resin formed over said first insulating layer;
   a third insulating layer comprising diamond-like carbon formed over said second insulating layer;
   a pixel electrode formed over said third insulating layer, said pixel electrode electrically connected to said thin film transistor; and a light-emitting layer formed over said third insulating layer.

6. An electroluminescence display device according to claim 5, wherein said organic resin is selected from the group consisting of polyimide, polyimideamide, polyamide, acryl and epoxy.

7. An electroluminescence display device according to claim 5, wherein said second insulating layer has a planarized surface.

8. An electroluminescence display device according to claim 5, wherein said electroluminescence display device is incorporated into an electric apparatus selected from the group consisting of a portable information terminal, a head mount display, a portable telephone, a video camera and a projector.

9. An electroluminescence display device comprising:
at least one thin film transistor formed over a substrate;
a first insulating layer comprising organic resin formed over said thin film transistor;
a second insulating layer comprising diamond-like carbon formed over said first insulating layer;
a third insulating layer comprising organic resin formed over said second insulating layer;
a pixel electrode formed over said third insulating layer, said pixel electrode electrically connected to said thin film transistor; and
a light-emitting layer formed over said third insulating layer.

10. An electroluminescence display device according to claim 9, wherein said organic resin are selected from the group consisting of polyimide, polyimideamide, polyamide, acryl and epoxy.

11. An electroluminescence display device according to claim 9, wherein said first insulating layer has a planarized surface.

12. An electroluminescence display device according to claim 9, wherein said electroluminescence display device is incorporated into an electric apparatus selected from the group consisting of a portable information terminal, a head mount display, a portable telephone, a video camera and a projector.

13. An electroluminescence display device comprising:
an active matrix region and a driver region formed over a substrate, wherein said active matrix region comprises:
at least one thin film transistor;
a first insulating layer comprising organic resin formed over said thin film transistor;
a second insulating layer comprising diamond-like carbon formed over said first insulating layer;
a pixel electrode formed over said second insulating layer, said pixel electrode electrically connected to said thin film transistor; and
a light-emitting layer formed over said second insulating layer.

14. An electroluminescence display device according to claim 13, wherein said organic resin is selected from the group consisting of polyimide, polyimideamide, polyamide, acryl and epoxy.

15. An electroluminescence display device according to claim 13, wherein said first insulating layer has a planarized surface.

16. An electroluminescence display device according to claim 13, wherein said electroluminescence display device is incorporated into an electric apparatus selected from the group consisting of a portable information terminal, a head mount display, a portable telephone, a video camera and a projector.

17. An electroluminescence display device comprising:
an active matrix region and a driver region over a substrate, wherein said active matrix region comprises:
at least one thin film transistor;
a first insulating layer comprising silicon nitride formed over said thin film transistor;
a second insulating layer comprising organic resin formed over said first insulating layer;
a third insulating layer comprising diamond-like carbon formed over said second insulating layer;
a pixel electrode formed over said third insulating layer, said pixel electrode electrically connected to said thin film transistor; and
a light-emitting layer formed over said third insulating layer.

18. An electroluminescence display device according to claim 17, wherein said organic resin is selected from the group consisting of polyimide, polyimideamide, polyamide, acryl and epoxy.

19. An electroluminescence display device according to claim 17, wherein said second insulating layer has a planarized surface.

20. An electroluminescence display device according to claim 17, wherein said electroluminescence display device is incorporated into an electric apparatus selected from the group consisting of a portable information terminal, a head mount display, a portable telephone, a video camera and a projector.

21. An electroluminescence display device comprising:
an active matrix region and a driver region over a substrate, wherein said active matrix region comprises:
at least one thin film transistor;
a first insulating layer comprising organic resin formed over said thin film transistor;
a second insulating layer comprising diamond-like carbon formed over said first insulating layer;
a third insulating layer comprising organic resin formed over said second insulating layer;
a pixel electrode formed over said third insulating layer, said pixel electrode electrically connected to said thin film transistor; and
a light-emitting layer formed over said third insulating layer.

22. An electroluminescence display device according to claim 21, wherein said organic resin are selected from the group consisting of polyimide, polyimideamide, polyamide, acryl and epoxy.

23. An electroluminescence display device according to claim 21, wherein said first insulating layer has a planarized surface.

24. An electroluminescence display device according to claim 21, wherein said electroluminescence display device is incorporated into an electric apparatus selected from the group consisting of a portable information terminal, a head mount display, a portable telephone, a video camera and a projector.

25. An electroluminescence display device comprising:
a switching element comprising at least one thin film transistor formed over a substrate;
a first insulating layer comprising organic resin formed over said switching element;
a second insulating layer comprising diamond-like carbon formed over said first insulating layer;
a pixel electrode formed over said second insulating layer, said pixel electrode electrically connected to said thin film transistor; and a light-emitting layer formed over said second insulating layer.

26. An electroluminescence display device according to claim 25, wherein said organic resin is selected from the group consisting of polyimide, polyimideamide, polyamide, acryl and epoxy.

27. An electroluminescence display device according to claim 25, wherein said first insulating layer has a planarized surface.

28. An electroluminescence display device according to claim 25, wherein said electroluminescence display device is incorporated into an electric apparatus selected from the group consisting of a portable information terminal, a head mount display, a portable telephone, a video camera and a projector.

29. An electroluminescence display device comprising:
a switching element comprising at least one thin film transistor formed over a substrate;
a first insulating layer comprising organic resin having a flattened upper surface, formed over said switching element;
a second insulating layer comprising diamond-like carbon formed over said first insulating layer;
a pixel electrode formed over said second insulating layer, said pixel electrode electrically connected to said thin film transistor; and
a light-emitting layer formed over said second insulating layer.

30. An electroluminescence display device according to claim 29, wherein said organic resin is selected from the group consisting of polyimide, polyimideamide, polyamide, acryl and epoxy.

31. An electroluminescence display device according to claim 29, wherein said first insulating layer has a planarized surface.

32. An electroluminescence display device according to claim 29, wherein said electroluminescence display device is incorporated into an electric apparatus selected from the group consisting of a portable information terminal, a head mount display, a portable telephone, a video camera and a projector.

33. An electroluminescence display device comprising:
at least one thin film transistor formed over a substrate;
a flattened insulating layer formed over said thin film transistor;
an insulating layer comprising diamond-like carbon formed over said flattened insulating layer;
a pixel electrode formed over said insulating layer comprising diamond-like carbon, said pixel electrode electrically connected to said thin film transistor; and
a light-emitting layer formed over said insulating layer.

34. An electroluminescence display device according to claim 33, wherein said flattened insulating layer comprises an organic resin selected from the group consisting of polyimide, polyimideamide, polyamide, acryl and epoxy.

35. An electroluminescence display device according to claim 33, wherein said electroluminescence display device is incorporated into an electric apparatus selected from the group consisting of a portable information terminal, a head mount display, a portable telephone, a video camera and a projector.

36. An electroluminescence display device comprising:
at least one thin film transistor formed over a substrate;
a first flattened insulating layer formed over said thin film transistor;
an insulating layer comprising diamond-like carbon formed over said first flattened insulating layer;
a second flattened insulating layer formed over said insulating layer comprising diamond-like carbon;
a pixel electrode formed over said insulating layer comprising diamond-like carbon, said pixel electrode electrically connected to said thin film transistor; and
a light-emitting layer formed over said second flattened insulating layer.

37. An electroluminescence display device according to claim 36, wherein at least one of said first and second flattened insulating layers comprises an organic resin selected from the group consisting of polyimide, polyimideamide, polyamide, acryl and epoxy.

38. An electroluminescence display device according to claim 36, wherein said electroluminescence display device is incorporated into an electric apparatus selected from the group consisting of a portable information terminal, a head mount display, a portable telephone, a video camera and a projector.

39. A portable information terminal comprising:
at least one thin film transistor formed over a substrate;
a flattened insulating layer formed over said thin film transistor;
an insulating layer comprising diamond-like carbon formed over said flattened insulating layer;
a pixel electrode formed over said insulating layer comprising diamond-like carbon, said pixel electrode electrically connected to said thin film transistor; and
a light-emitting layer formed over said insulating layer.

40. A portable information terminal according to claim 39, wherein said flattened insulating layer comprises an organic resin selected from the group consisting of polyimide, polyimideamide, polyamide, acryl and epoxy.

41. A portable information terminal comprising:
at least one thin film transistor formed over a substrate;
a first flattened insulating layer formed over said thin film transistor;
an insulating layer comprising diamond-like carbon formed over said first flattened insulating layer;
a second flattened insulating layer formed over said insulating layer comprising diamond-like carbon;
a pixel electrode formed over said insulating layer comprising diamond-like carbon, said pixel electrode electrically connected to said thin film transistor; and
a light-emitting layer formed over said second flattened insulating layer.

42. A portable information terminal according to claim 41, wherein at least one of said first and second flattened insulating layers comprises an organic resin selected from the group consisting of polyimide, polyimideamide, polyamide, acryl and epoxy.

43. A head mount display comprising:
at least one thin film transistor formed over a substrate;
a flattened insulating layer formed over said thin film transistor;
an insulating layer comprising diamond-like carbon formed over said flattened insulating layer;
a pixel electrode formed over said insulating layer comprising diamond-like carbon, said pixel electrode electrically connected to said thin film transistor; and
a light-emitting layer formed over said insulating layer.

44. A head mount display according to claim 43, wherein said flattened insulating layer comprises an organic resin selected from the group consisting of polyimide, polyimideamide, polyamide, acryl and epoxy.

45. A head mount display comprising:
   at least one thin film transistor formed over a substrate;
   a first flattened insulating layer formed over said thin film transistor;
   an insulating layer comprising diamond-like carbon formed over said first flattened insulating layer;
   a second flattened insulating layer formed over said insulating layer comprising diamond-like carbon;
   a pixel electrode formed over said insulating layer comprising diamond-like carbon, said pixel electrode electrically connected to said thin film transistor; and
   a light-emitting layer formed over said second flattened insulating layer.

46. A head mount display according to claim 45, wherein at least one of said first and second flattened insulating layers comprises an organic resin selected from the group consisting of polyimide, polyimideamide, polyamide, acryl and epoxy.

47. A portable telephone comprising:
   at least one thin film transistor formed over a substrate;
   a flattened insulating layer formed over said thin film transistor;
   an insulating layer comprising diamond-like carbon formed over said flattened insulating layer;
   a pixel electrode formed over said insulating layer comprising diamond-like carbon, said pixel electrode electrically connected to said thin film transistor; and
   a light-emitting layer formed over said insulating layer.

48. A portable telephone according to claim 47, wherein said flattened insulating layer comprises an organic resin selected from the group consisting of polyimide, polyimideamide, polyamide, acryl and epoxy.

49. A portable telephone comprising:
   at least one thin film transistor formed over a substrate;
   a first flattened insulating layer formed over said thin film transistor;
   an insulating layer comprising diamond-like carbon formed over said first flattened insulating layer;
   a second flattened insulating layer formed over said insulating layer comprising diamond-like carbon;
   a pixel electrode formed over said insulating layer comprising diamond-like carbon, said pixel electrode electrically connected to said thin film transistor; and
   a light-emitting layer formed over said second flattened insulating layer.

50. A portable telephone according to claim 49, wherein at least one of said first and second flattened insulating layers comprises an organic resin selected from the group consisting of polyimide, polyimideamide, polyamide, acryl and epoxy.

51. A video camera comprising:
   at least one thin film transistor formed over a substrate;
   a flattened insulating layer formed over said thin film transistor;
   an insulating layer comprising diamond-like carbon formed over said flattened insulating layer;
   a pixel electrode formed over said insulating layer comprising diamond-like carbon, said pixel electrode electrically connected to said thin film transistor; and
   a light-emitting layer formed over said insulating layer.

52. A video camera according to claim 51, wherein said flattened insulating layer comprises an organic resin selected from the group consisting of polyimide, polyimideamide, polyamide, acryl and epoxy.

53. A video camera comprising:
   at least one thin film transistor formed over a substrate;
   a first flattened insulating layer formed aver said thin film transistor;
   an insulating layer comprising diamond-like carbon formed over said first flattened insulating layer;
   a second flattened insulating layer formed over said insulating layer comprising diamond-like carbon;
   a pixel electrode formed over said insulating layer comprising diamond-like carbon, said pixel electrode electrically connected to said thin film transistor; and
   a light-emitting layer formed over said second flattened insulating layer.

54. A video camera according to claim 53, wherein at least one of said first and second flattened insulating layers comprises an organic resin selected from the group consisting of polyimide, polyimideamide, polyamide, acryl and epoxy.

55. A projector comprising:
   at least one thin film transistor formed over a substrate;
   a flattened insulating layer formed over said thin film transistor;
   an insulating layer comprising diamond-like carbon formed over said flattened insulating layer;
   a pixel electrode formed over said insulating layer comprising diamond-like carbon, said pixel electrode electrically connected to said thin film transistor; and
   a light-emitting layer formed over said insulating layer.

56. A projector according to claim 55, wherein said flattened insulating layer comprises an organic resin selected from the group consisting of polyimide, polyimideamide, polyamide, acryl and epoxy.

57. A projector comprising:
   at least one thin film transistor formed over a substrate;
   a first flattened insulating layer formed over said thin film transistor;
   an insulating layer comprising diamond-like carbon formed over said first flattened insulating layer;
   a second flattened insulating layer formed over said insulating layer comprising diamond-like carbon;
   a pixel electrode formed over said insulating layer comprising diamond-like carbon, said pixel electrode electrically connected to said thin film transistor; and
   a light-emitting layer formed over said second flattened insulating layer.

58. A projector according to claim 57, wherein at least one of said first and second flattened insulating layers comprises an organic resin selected from the group consisting of polyimide, polyimideamide, polyamide, acryl and epoxy.

* * * * *

UNITED STATES PATENT AND TRADEMARK OFFICE
CERTIFICATE OF CORRECTION

PATENT NO.         : 6,927,826 B2                                        Page 1 of 1
APPLICATION NO. : 09/748166
DATED              : August 9, 2005
INVENTOR(S)        : Shunpei Yamazaki     It is certified that error appears in the above-identified patent and that said Letters Patent is hereby corrected as shown below:

On the Title Page, Item (73) Assignee, replace "Labaratory" with --Laboratory--.

Signed and Sealed this

Second Day of September, 2008

JON W. DUDAS
*Director of the United States Patent and Trademark Office*